(No Model.)

O. W. & J. A. BOSTON.
TEA KETTLE.

No. 509,865. Patented Dec. 5, 1893.

WITNESSES:
W. Schmit
F. J. McGrath

Orren W. Boston
John A. Boston
INVENTORS

BY G. W. Suess
ATTORNEY.

UNITED STATES PATENT OFFICE.

ORREN W. BOSTON AND JOHN A. BOSTON, OF DAVID CITY, NEBRASKA.

TEA-KETTLE.

SPECIFICATION forming part of Letters Patent No. 509,865, dated December 5, 1893.

Application filed March 6, 1893. Serial No. 464,899. (No model.)

*To all whom it may concern:*

Be it known that we, ORREN W. BOSTON and JOHN A. BOSTON, of David City, in the county of Butler and State of Nebraska, have invented certain useful Improvements in Tea-Kettles; and we do hereby declare that the following is a full, clear, and exact description of the invention, such as will enable others skilled in the art to which it appertains to make and use the same, reference being had to the accompanying drawings, which form a part of this specification.

This invention has relation to a new and novel improvement in tea kettles.

Figure 1:
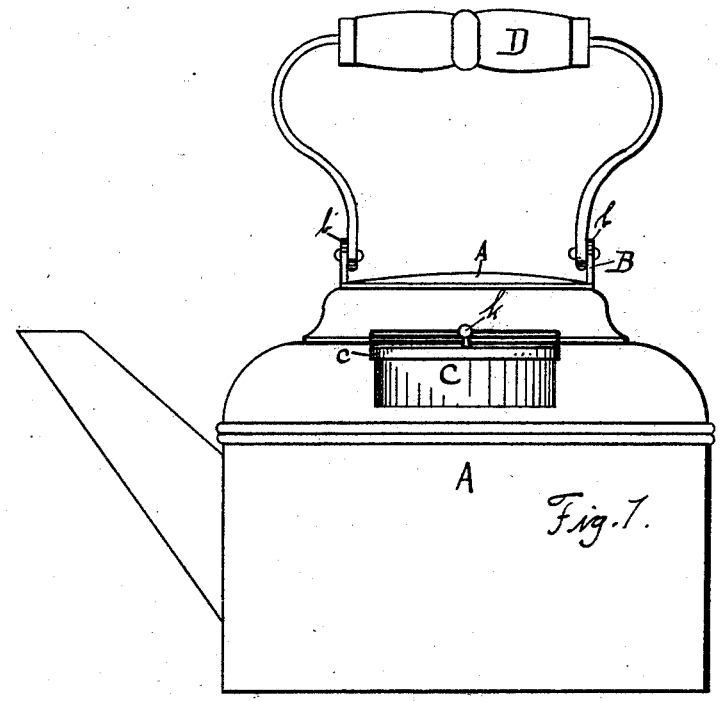
Figure 2:
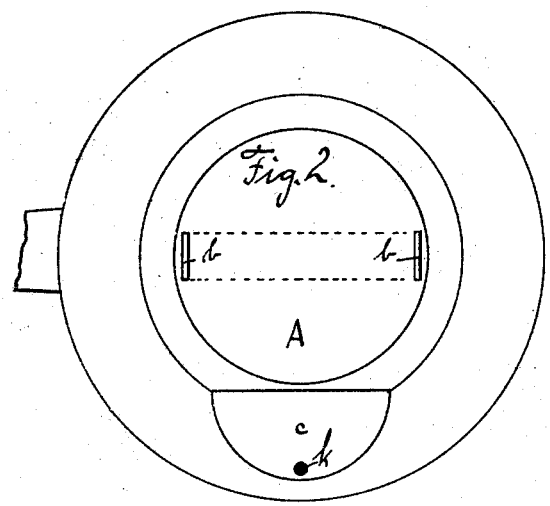
Figure 3:
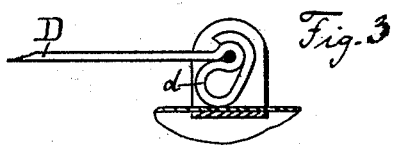

In the accompanying drawings, Figure 1 shows a side elevation of a tea kettle embodying our invention. Fig. 2 shows a top view of Fig. 1, with the handle removed. Fig. 3 shows a broken sectional view illustrating the arrangement of the eye of the handle.

This invention has relation to a new and novel improvement in tea kettles and the manner of connecting the handle thereto.

A represents a suitable tea kettle, which is provided with a solid top or breast portion A. At one point this breast portion is provided with the ear strap B, which is of strap metal and provided with the upwardly extending ears $b$, which extend through two suitable openings within the central portion of the kettle and in line with the spout, as will be understood by referring to Figs. 1 and 2. This strap B is either soldered or riveted to the top of the kettle at one side extending in the delivery spout of the kettle. Either to the right or left of the handle we provide a so called delivery pouch or lid opening C, which may be either oval, square or semi-circular, or in fact of any suitable conformation, forming part of the kettle. This opening is provided with a hinged lid, preferably opening inward and under the handle.

Now in emptying a kettle provided with the lid opening C, it will be noticed that the opening is upon the side and not below the handle, so that any escaping steam would pass aside from the end and also further offering a side delivery opening, as illustrated.

The bail or handle D, which is preferably made of wire, of our improved tea kettle, is provided with the extending loop $d$, passing outward at right angles to the bail proper from the supporting eyes, and recurving and binding upon the eye portion of the handle, from which the loop extended, as shown in Fig. 3. This loop portion extends at right angles to the handle proper, so that when the handle is dropped outward, the cam rides upon the breast of the kettle, as shown in the figure, and so suspends the handle and keeps it from contact with the kettle, so that it never becomes heated, and the handle falling upon the other side, would fall upon the knob $k$, by means of which the lid of the opening C is actuated. The central portion of the bail is in the shape of an eye adapted to nicely hold a rivet $m$, by means of which the handle is secured to the eyes $b$.

The cover of the lid opening, which is suitably hinged, is preferably provided with a downwardly projecting flange or edge, which rides over and surrounds the upper edge of the rim of the pouch.

Having thus described our said invention, what we claim as new, and desire to secure by United States Letters Patent, is—

1. The combination in a pot or kettle, having a solid top, spout and a lid opening near the edge, of an ear strap secured to the top of the vessel within, and having its two ends bent at an angle and extending through two slots within said top and in line with its delivery spout, and a handle secured to said extending ears, all substantially as and for the purpose set forth.

2. The combination with a pot, a kettle, having suitable bail ears, of a bail provided with supporting eyes, secured to said ears, the bail extending from said eyes in the form of a loop at an angle to the bail proper, and securing and binding upon the eye portions, so that when said bail is dropped the extending loops ride upon or against the vessel to keep the bail from contact with said vessel, all substantially as and for the purpose set forth.

In testimony whereof we affix our signatures in presence of two witnesses.

ORREN W. BOSTON.
JOHN A. BOSTON.

Witnesses:
EDWD. McCOLLOM,
T. E. DREFENDORF.